G. Jenkins,
Cider Press.

N° 38,682.                                    Patented May. 26, 1863.

Witnesses:                                    Inventor
J. W. Coombs                                  G. Jenkins
G. W. Reed                                    per Munn & Co.
                                              attorneys

AM. PHOTO-LITHO. CO. N.Y. (OSBORNE'S PROCESS)

UNITED STATES PATENT OFFICE.

G. JENKINS, OF QUEENSBURG, NEW YORK.

IMPROVEMENT IN FRUIT-PRESSES.

Specification forming part of Letters Patent No. 38,682, dated May 26, 1863.

*To all whom it may concern:*

Be it known that I, G. JENKINS, of Queensburg, in the county of Warren and State of New York, have invented a new and Improved Press for Compressing the Juice from Apples, Grapes, and other Fruits; and I do hereby declare that the following is a full, clear, and exact description of the same, reference being had to the accompanying drawings, making a part of this specification, in which—

Figure 1:
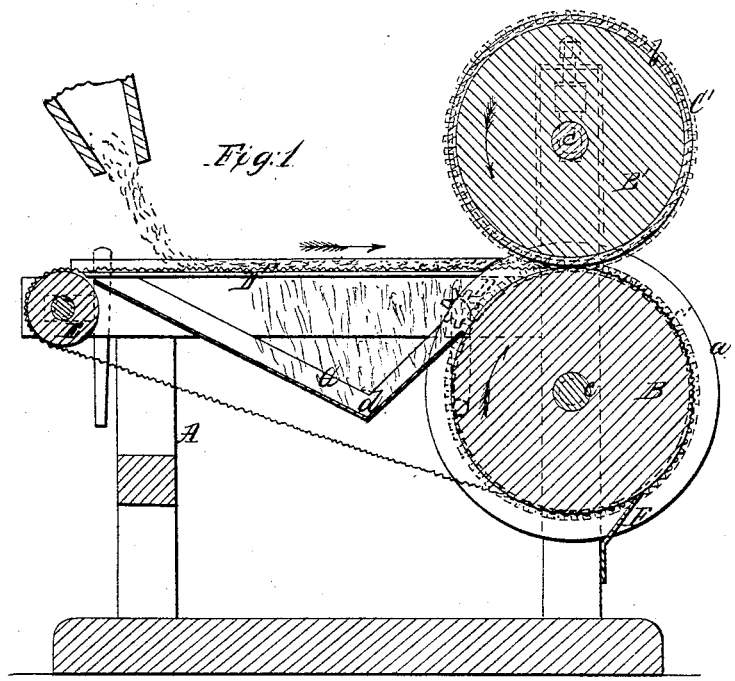
Figure 2:
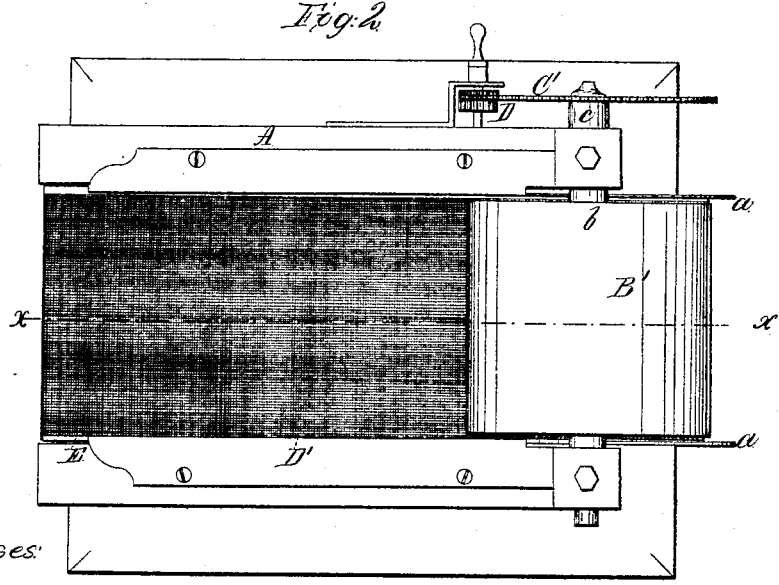

Figure 1 is a side sectional view of my invention, taken in the line $x\,x$, Fig. 2. Fig. 2 is a plan or top view of the same.

Similar letters of reference indicate corresponding parts in the two figures.

To enable those skilled in the art to fully understand and construct my invention, I will proceed to describe it.

A represents a framing, of rectangular form, in which two rollers, B B', are placed, one over the other, in the same axial plane. The lower roller, B, has its journals fitted in fixed bearings, and is provided at each end with a flange, $a$, and between these flanges the upper roller, B', is fitted, and works in contact with the roller B. The upper roller, B', has its journals fitted in adjustable bearings, acted upon by set-screws and springs for the purpose of regulating the pressure, as is usual in all pressure-rollers, and said upper roller, B', has its periphery covered with india-rubber, leather, or other suitable yielding material $b$. The shafts $c\,c$ of the rollers B B' are connected at one end by gears C C' into the lower one, C, of which a pinion, D, works, to the shaft of which the driving power is applied. The lower roller, B, may be either of metal or wood, and over said roller an endless apron, D', passes, said apron also passing over a small roller, E, in the end of the framing A opposite to that where the rollers B B' are placed. The upper part of the roller E is on a level with the upper part of the roller B, as shown in Fig. 1.

F is a metal plate, which is attached to the framing A just below the roller B. This plate F has an inclined position, and serves as a scraper for the apron D', said scraper extending the whole width of the roller B, and its upper edge just grazing the apron at the lower part of the roller B a little at the outer side of a vertical plane passing through its axis. (See Fig. 1.)

G is a box or receiver, which is placed in the framing A underneath the upper part of the apron D'. This box is of V form in its longitudinal section, as shown in Fig. 1, and extends from the roller B to the roller E, having the angle $d$ at its bottom slightly inclined, to admit of the escape of the juice therefrom.

The operation is as follows: The shaft of the pinion D may be turned by any convenient power, and motion is communicated to the rollers B B' by the gearing, previously described, said rollers communicating motion to the apron D'. The direction of the movement of the rollers B B' and apron D' is indicated by the red arms. In expressing juice from apples, the latter are previously ground or crushed by any suitable mill, the crushed or ground apples falling on the apron D' near the roller E, and are conveyed by said apron to the rollers B B', the juice passing through the apron into the receiver G. The crushed apples then pass between the rollers B B', and have the juice fully expressed from them, as the upper roller, B', has a sufficient pressure to effect that result. The juice that passes from the crushed apples prior to their reaching the pressure-rollers is that which was liberated from the apples during the crushing or grinding of the same. The yielding covering $b$ of the upper roller, B', prevents the seed of the apples or other fruit being crushed or broken, and this is a very important feature of the invention, for the crushing of the seed injures the flavor of the juice, and completely destroys the flavor of the wine. It also greatly injures cider, but not to so great a degree as wine. The scraper F scrapes all the pomace from the apron D', so that the fruit will always pass on a clean surface on the upper part of the former.

I would remark that the apron D' may be constructed of fine wire-cloth, brass wire being preferable. Other material, however, may be used.

Having thus described my invention, what I claim as new, and desire to secure by Letters Patent, is—

1. Having the upper roller, B', covered with leather, india rubber, or other suitable yielding material, $b$, when said roller thus covered is used in combination with the endless apron D' and roller B, for the purpose specified.

2. The scraper F, when applied to the endless apron D', underneath the roller B, as and for the purpose specified.

G. JENKINS.

Witnesses:
M. C. RICH,
A. C. WINCHIP.